United States Patent [19]

Kouvelis

[11] Patent Number: 4,818,157

[45] Date of Patent: Apr. 4, 1989

[54] QUICK-CHANGE ADAPTER AND TOOLS FOR USE WITH THE ADAPTER

[75] Inventor: Thomas Kouvelis, Berwyn, Ill.

[73] Assignee: James E. Scapillato, LaGrange Park, Ill. ; a part interest

[21] Appl. No.: 948,106

[22] Filed: Dec. 31, 1986

[51] Int. Cl.⁴ .............................................. B23B 31/22
[52] U.S. Cl. ...................................... 408/240; 81/125; 279/1 B
[58] Field of Search ............... 468/226, 239 R, 239 A, 468/240; 279/1 A, 1 B, 76, 79; 81/121.1, 124.5, 125

[56] References Cited

U.S. PATENT DOCUMENTS

| 710,116 | 9/1902 | Osteman et al. | 408/239 R X |
|---|---|---|---|
| 2,095,852 | 10/1937 | Booth | 279/76 |
| 2,483,662 | 10/1949 | Niederhiser | 279/1 A |
| 2,641,479 | 6/1953 | Gabriele | 279/79 X |
| 2,662,773 | 12/1953 | Parsons | 279/30 |
| 2,974,965 | 3/1961 | Welles, Sr. | 408/226 X |
| 3,036,839 | 5/1962 | Williamson, Jr. | 279/76 X |
| 3,245,694 | 4/1966 | Parker | 279/30 |
| 3,251,605 | 5/1966 | Ondeck | 408/239 R X |
| 3,289,290 | 12/1966 | Sandor | 29/240 X |
| 3,767,218 | 10/1973 | Linthicum et al. | 279/75 |
| 4,184,692 | 1/1980 | Benson et al. | 408/226 X |
| 4,349,929 | 9/1982 | Dewey | 279/1 A X |
| 4,629,375 | 12/1986 | Lieser | 408/239 R |

Primary Examiner—Z. R. Bilinsky
Attorney, Agent, or Firm—Welsh & Katz, Ltd.

[57] ABSTRACT

A quick-change adapter for rotary devices such as power drills comprises a shaft that can be inserted in a chuck of the powered rotary tool. The shaft is coupled to and is coaxial with a tool holder that inlcudes means for retaining a tool and means for driving the tool. The retaining means typically involve one or more spring-loaded balls that engage a groove or detent in the tool. The driving means include a shape that is not circular, to engage a corresponding shape on the tool to apply torque, and a surface having a component that is substantially perpendicular to the axis of the adapter to enable the application of force in an axial direction. Tools such as drills, screw drivers, and the like are rendered usable with the adapter by receiving a shaft to fit the adapter and couple torque from the adapter, a groove or detent to fit the retaining means, and a shoulder or the like to apply axial thrust.

9 Claims, 2 Drawing Sheets

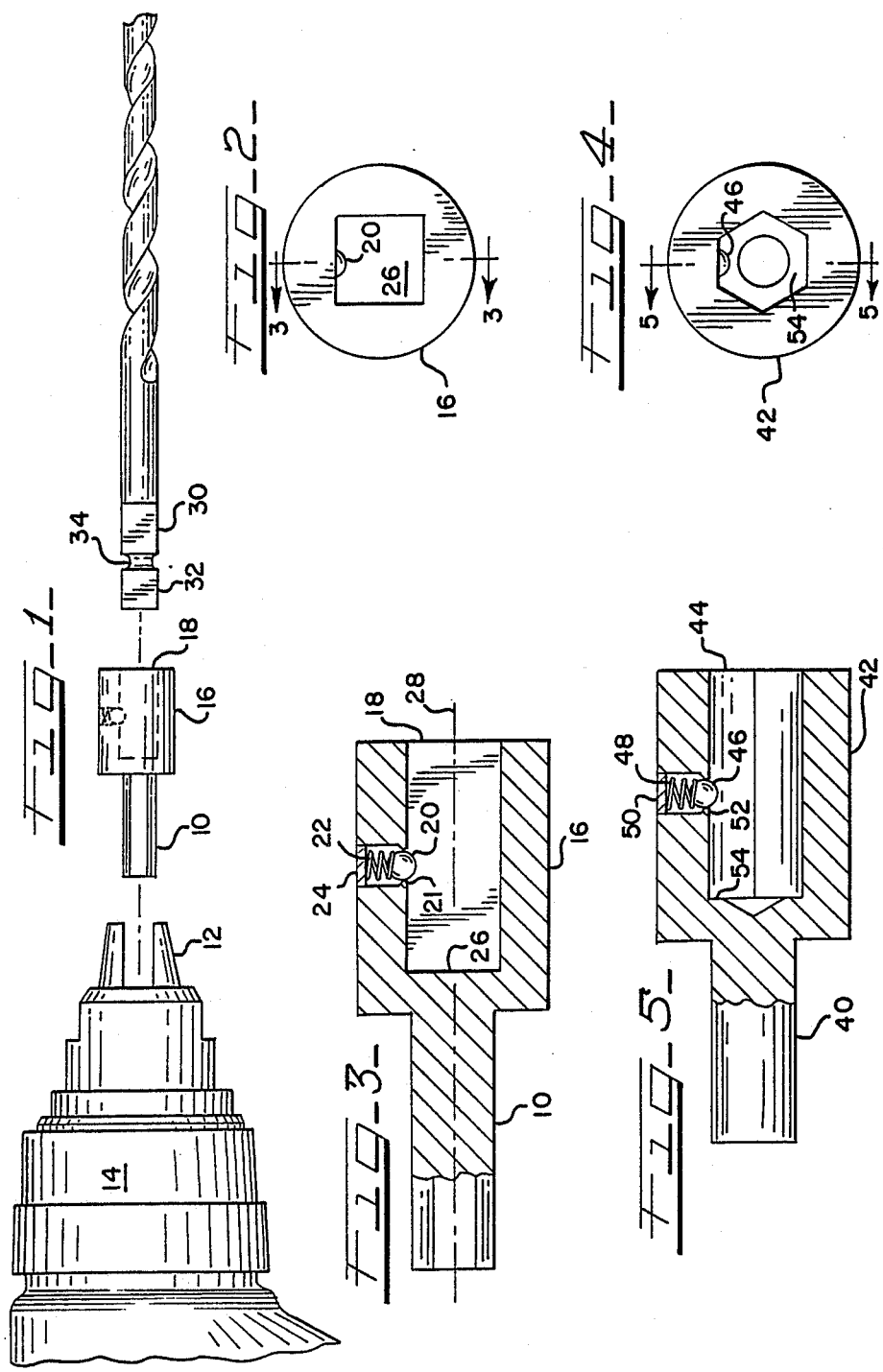

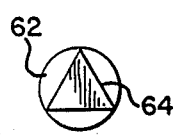
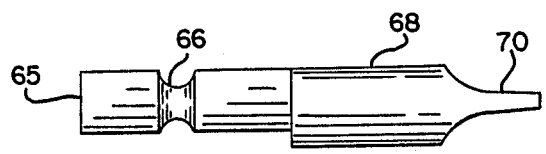
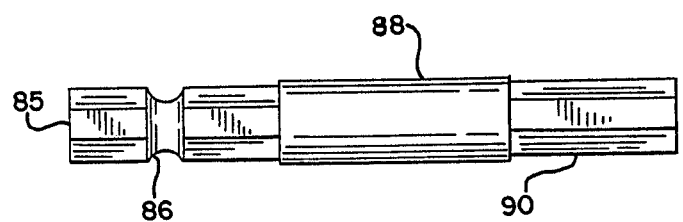

QUICK-CHANGE ADAPTER AND TOOLS FOR USE WITH THE ADAPTER

BACKGROUND OF THE INVENTION

This invention relates to quick-change adapters and tools for use with them. In particular, it relates to an apparatus to be inserted in a chuck of a rotary device that enables quick insertion of special tools into the rotary device and quick removal of the special tools from the device.

Quick-change adapters and tools have been widely used in two ways. One of these is in powered rotary devices in which a quick-change chuck or tool holder is permanently attached to the rotary device. Such adapters are often used in pneumatically powered drills and wrenches and the like. A typical example of such a tool and quick-change device is shown in U.S. Pat. No. 4,209,182, entitled "Bit Retainer for Screwdriver." A feature of this and other typical quick-change chucks is a sliding collar that releases one or more retaining balls, permitting insertion or removal of a tool. As with the device shown here, it is common to use the retaining ball as the device which imparts axial thrust to the tool. Torque may be imparted by the retaining ball or balls or by contact with some portion of the chuck.

A second type of commonly used quick-change device is typified by the ratchet wrench in which a ball serves only as a retainer. Torque in such devices is typically applied from a shaft on the wrench that is prismatic in cross-section and which fits a similarly shaped cutout on the tool. Such devices appear most commonly with hand-powered tools such as wrenches. It is common to find ratchet wrenches with quick-change devices in the tool box of the homeowner. Quick-change tools for power devices, however, have not been readily available for the do-it-yourselfer or craftsman. Instead, he has typically to use an electric drill or other powered device that either has a dedicated tool or else has tools that are changed by operating a key in a chuck. It would be useful to have a quick-change tool that was inexpensive and that was readily usable by anyone who has an electric drill.

SUMMARY OF THE INVENTION

It is an object of the present invention to provide a better quick-change adapter with quick-change tools adapted for use with the adapter.

It is a further object of the present invention to provide a means of adapting a power tool having a chuck to function as a quick-change device.

It is a further object of the present invention to provide a means of equipping a common rotary power device such as an electric drill to serve as a quick-change device for tools.

Other objects will become apparent in the course of a detailed description of the invention.

A quick-change adapter for rotary devices such as power drills comprises a shaft that can be inserted in a chuck of the powered rotary tool. The shaft is coupled to and is coaxial with a tool holder that includes means for retaining a tool and means for driving the tool. The retaining means typically involves one or more spring-loaded balls that engage a groove or detent in the tool. The driving means include a shape that is not circular, to engage a corresponding shape on the tool to apply torque, and a surface having a component that is substantially perpendicular to the axis of the adapter to enable the application of force in an axial direction. Tools such as drills, screw drivers, and the like are rendered usable with the adapter by receiving a shaft to fit the adapter and couple torque from the adapter, a groove or detent to fit the retaining means, and a shoulder or the like to apply axial thrust.

BRIEF DESCRIPTION OF THE DRAWINGS

FIG. 1 is a side view of the quick-coupling adapter of the present invention with a drill and a tool.

FIG. 2 is an end view of the quick-coupling adapter of FIG. 1.

FIG. 3 is a sectional side view of the quick-coupling adapter of FIG. 2, taken along section lines 3—3.

FIG. 4 is an end view of an alternate embodiment of the quick-coupling adapter of FIG. 1.

FIG. 5 is a sectional side view of the quick-coupling adapter of FIG. 4, taken along section lines 5—5 of FIG. 4.

FIG. 6 is a side view of a screwdriver bit with a triangular driving means.

FIG. 7 is an end view of the bit of FIG. 6.

FIG. 8 is a side view of an Allen wrench bit with a hexagonal driving means.

FIG. 9 is an end view of the bit of FIG. 8.

DETAILED DESCRIPTION OF THE PREFERRED EMBODIMENT

FIG. 1 is a side view of the quick-coupling adapter of the present invention, together with a drill and a tool. FIG. 2 is an end view of one embodiment of the adapter, and FIG. 3 is a sectional side view taken along section lines 3—3 of FIG. 2. In FIGS. 1, 2 and 3, a shaft 10 is adapted for insertion into a chuck 12 of a rotary tool 14. Rotary tool 14 is typically an electric drill, size $\frac{1}{4}$ inch, $\frac{3}{8}$ inch, or $\frac{1}{2}$ inch. These are the sizes typically available for non-industrial use, although the invention can be practiced with drills of other sizes, with hand-operated twist drills, bit braces, and the like. Shaft 10 may have any cross-section that can be chucked and that can maintain an axis of symmetry. Thus, shaft 10 may be round, triangular, square, hexagonal, octagonal or the like in cross-section. It is shown here as hexagonal. Shaft 10 is connected to collar 16 so that the two are coaxial about axis 28. Collar 16 includes a driving aperture 18, a cross-section of which is not round. Preferred shapes for the cross-section of driving aperture 18 are triangular, square, hexagonal, and octagonal. These and other shapes that are not round provide surfaces for the application of torque. Collar 16 includes a ball 20 that projects into driving aperture 18, constrained by shoulder 21 that has a diameter less than the diameter of ball 18. Ball 20 is urged toward driving aperture 18 by spring 22. A plug 24 allows the insertion of ball 20 and spring 22 when the adapter is manufactured. One ball 20 is shown here, but it should be evident that additional balls 20 could be inserted to project into driving aperture 18 at other locations.

Collar 16 also includes a surface 26 that is substantially perpendicular to the axis 28 of shaft 10 and collar 16. Surface 26 is adapted to make contact with a tool 30 that is placed in driving aperture 18, to provide a means for exerting axial thrust. Surface 26 may extend completely across driving aperture 18, as shown, or it may be a shoulder that covers a portion of the cross-section of driving aperture 18. This is a matter of design choice based in particular on manufacturing convenience.

Tool 30 includes a shaft 32 that is designed to fit driving aperture 18 and permit the application of torque to the shaft 32 by driving aperture 18. In the preferred embodiment of FIGS. 1, 2, and 3, shaft 32 has the square cross-section shown, but it is evident that shaft 32 could equally as well be triangular, hexagonal, octagonal, or of any shape except circular. Shaft 32 includes a groove 34 that is sized and placed to receive one or more balls 20 when shaft 32 is placed within driving aperture 18 so as to make contact with surface 26. The function of groove 34 is to retain tool 30 in driving aperture 18. While the preferred embodiment includes a groove such as that shown here, it should be evident that tool 30 could equally as well be retained by any properly sized and placed detent or detents. Tool 30 is here shown as part of a drill 36, but it could be evident that shaft 32 could equally as well be connected to a screwdriver bit, wood bit, Allen wrench, nut driver, socket wrench, countersink, counterbore, sander, buffer, wire brush, router, hole saw, paint stirrer, or any other such tool that is driven by a source of rotary power.

FIG. 4 is an end view of an alternate embodiment of the quick-change adapter of the present invention, and FIG. 5 is a partial sectional side view of the adapter, taken along section lines 5—5 of FIG. 4. In the alternate embodiment of FIGS. 4 and 5, shaft 40 is taken as round. This is a matter of design choice. Collar 42 has a driving aperture 44 that is hexagonal in cross-section. Ball 46 projects into driving aperture 44 against a force exerted by spring 48 wich in turn is held in place by plug 50. Shoulder 52 limits the motion of ball 46 so that ball 46 remains captive. As before, more than one ball 46 may be provided to retain a tool more effectively. Surface 54 is provided for exerting axial thrust against a tool that is placed in driving aperture 44. Surface 54 does not cover the entire cross-section of aperture 44, as did surface 26 of FIGS. 2 and 3. It should be evident that the shape of the cross-sections of shafts 40, driving apertures 44, and surface 54, and their equivalents in FIGS. 2 and 3, are matters of design choice selected to meet the following criteria. Shafts 10 and 40 must be capable of insertion into the chuck of the drill or other rotary device, and maintain a position there that is symmetric about the axis of symmetry of the chuck. Driving apertures 18 and 44 need a shape that is other than that of a circular cylinder so as to permit the application of rotational torque to a tool. Surfaces 26 and 54 need at least some component that is perpendicular to the axis of the adapter to permit the application of axial thrust to the tool.

FIG. 6 is a side view of a screwdriver bit with a driving means having a triangular cross-section, and FIG. 7 is an end view of the bit of FIG. 6. In FIGS. 6 and 7, bit 62 has a cross-section that is triangular, to present surfaces 64 to a similarly shaped cross-section in driving aperture 18 of the adapter of FIG. 1 or 3 or driving aperture 44 of the adapter of FIG. 5. Surface 65 receives axial thrust from the adapter. In FIG. 6, groove 66 is located in a proper position to receive one or more retaining balls to hold bit 62 in place in an adapter. The groove 66 is a matter of design choice, as one or more detents could equally as well be used. Shaft 68 is connected to bit 62 and to screwdriver head 70 to form a tool that is adapted for the practice of the invention.

FIG. 8 is a side view of an alternate embodiment of the invention, and FIG. 9 is an end view of the bit of FIG. 8. In FIGS. 8 and 9, bit 82 has a cross-section that is octagonal, presenting eight driving surfaces 84 to receive torque from an adapter. Surface 85 receives axial thrust from the adapter. Groove 86 will receive and engage one or more retaining balls in the adapter to hold bit 82 in place. As before, one or more detents would serve the same function as groove 86. Shaft 88 is here shown connected to Allen wrench 90, which is designed to engage screws and balls with a hexagonal Allen drive. Screwdriver head 70 of FIGS. 6 and 7 and Allen wrench 90 of FIGS. 8 and 9 are only two examples of the many tools that can be used in the practice of the present invention. These illustrative examples are not intended to limit the scope of the invention, which extends to the appended claims.

What is claimed is:

1. A combination unitary quick-change adapter for use with a chuck of an electric drill and a unitary bit designed for adjustment-free, axial insertion into and removal from the adapter, the combination comprising:

said adapter including:
   a shaft portion of solid cross-section and having a longitudinal axis and first and second opposing ends, said first end adapted for insertion into the chuck of the electric drill;
   a generally tubular collar portion having an open end and a closed end integral with and immovably fixed to said second end of said shaft, said collar portion being coaxial with said axis of the shaft portion and being provided with an inner peripheral wall portion having a polygonal cross-section centered about the shaft axis and defining an open interior of said collar;
   a throughbore opening in said peripheral wall portion being perpendicular to said shaft axis and having a narrowed inner end and an outer end;
   a ball and a compression spring provided in said opening in direct contact with each other so that said ball is biased by said spring against said narrowed inner end to permit a portion of said ball to project vertically into said interior of said collar and perpendicular to said axis; and
   a plug dimensioned to enclose said outer end of said opening and adapted to retain said spring and said ball therein;
   said bit including a shaft end and a work end, said shaft end having a polygonal cross-section adapted to matingly engage said polygonal inner peripheral wall portion in said collar portion, said shaft end further having a circumferential area of reduced diameter adapted to be engaged by said spring-biased ball when said shaft end is inserted into said collar portion so as to be in direct contact with said closed end, said closed end adapted to exert axial driving force upon said shaft end of said tool;
   said tool being secured within said collar by said spring-biased ball and by said mating engagement between said shaft end and said inner peripheral wall so that the tool may be axially inserted into and removed from the adapter without any manipulation or adjustment of the adapter.

2. The adapter of claim 1 wherein the shaft has a circular cross-section.

3. The adapter of claim 1 wherein the shaft has a triangular cross-section.

4. The adapter of claim 1 wherein the shaft has a hexagonal cross-section.

5. The adapter of claim 1 wherein the shaft has an octagonal cross-section.

6. The adapter of claim 1 wherein the inside surface of the collar has a triangular cross-section.

7. The adapter of claim 1 wherein the inside surface of the collar has a square cross-section.

8. The adapter of claim 1 wherein the inside surface of the collar has a hexagonal cross-section.

9. The adapter of claim 1 wherein the inside surface of the collar has an octagonal cross-section.

* * * * *